Patented July 11, 1950

2,515,120

UNITED STATES PATENT OFFICE 2,515,120

PRODUCTION OF ORGANIC COMPOUNDS CONTAINING SULFUR AND OXYGEN

Denham Harman, Berkeley, Calif., assignor to Shell Development Company, San Francisco, Calif., a corporation of Delaware No Drawing. Application November 15, 1948, Serial No. 60,175

6 Claims. (Cl. 260—607)

This invention relates to a novel concurrent reaction between a compound containing a thiol group, an olefinically unsaturated compound and gaseous oxygen. More particularly, the invention provides an economical process for converting mercaptans and olefins to more valuable organic compounds containing both sulfur and oxygen.

Numerous compounds containing thiol groups, as well as olefinically unsaturated compounds, are readily available at low cost, particularly as by-products of the petroleum refining and allied industries. Organic compounds containing sulfur and oxygen, including sulfones, sulfoxides, and sulfides containing oxygen in the form of hydroxyl, carbonyl, carboxyl, and the like groups, are particularly valuable for numerous applications. They are valuable ingredients of, or intermediates for, the preparation of many surface active agents, lubricating oil additives, insecticidal compositions and the like. Heretofore, the production of compounds containing sulfur and oxygen has required a series of several reactions, the employment of the relatively costly decomposing oxidizing agents, or the use of relatively costly starting materials.

It is known that olefinically unsaturated compounds react with gaseous oxygen, but in the absence of an oxidation catalyst, such reactions occur only in the vapor phase, at relatively high temperatures (above about 400° C.). Similarly, it is known that mercaptans can be oxidized by the action of gaseous oxygen, but the reaction is difficult to accomplish in the absence of catalysts and the oxidation affects only the divalent sulfur atoms and seldom proceeds beyond the production of disulfides. The reaction between an olefin and a mercaptan is only known to produce sulfides, which are very difficult to convert to oxygenated compounds.

We have now surprisingly discovered that when an oxygen containing gas is passed into a liquid in which a compound containing at least one thiol group is present in the same phase with an olefinically unsaturated compound (although the reaction is conducted under conditions of temperature, pressure and time under which neither the sulfur containing compound, nor the olefinic compound, would combine with oxygen when treated alone) a rapid reaction occurs producing high yields of organic compounds containing oxygen and sulfur and generally having as many carbon atoms as the total of those of the compound containing thiol groups plus those of the olefinic compound.

The process of the invention is applicable to the conversion of any mercaptan (employing the term mercaptan in a broad sense to include compounds containing one or more thiol groups) which is stable in the pure form or when dissolved in an inert solvent. Illustrative examples of mercaptans which undergo reactions in accordance with the process of the invention include: hydrocarbon mercaptans such as methanethiol, eicosanethiol, 1,4-butanedithiol, 3-methylcyclohexanemethanethiol, 1,4,6-hexanetrithiol, and benzenethiol; and mercaptans containing functional groups in addition to thiol groups such as 3 - chlorobutanethiol, 4 - bromocyclohexanemethanethiol, 2 - mercaptoethanol, gamma - mercapto-alpha,beta-dimethylbutyric acid, 2 - mercaptoethylsulfone and 4-methoxybenzenethiol. Hydrocarbon mercaptans are preferred starting compounds, particularly when they are free of aliphatic multiple bonds. The alkanethiols, typified by octanethiol and 2-methylpropanethiol, are especially suitable reactants for the process of the invention. Mercaptans containing from 1 to 20 carbon atoms are of the molecular size preferred for employment in the process.

Hydrogen sulfide can generally be substituted for the mercaptan, and valuable organic compounds containing sulfur and oxygen can be produced in accordance with the process of the invention by passing oxygen and hydrogen sulfide into an olefinic compound maintained in the liquid phase.

Any olefinically unsaturated compound capable of existing as a monomeric liquid, either in pure form or as a solution in an inert solvent, under normal or elevated pressures in the presence of oxygen at temperatures above about 0° C., undergoes reaction in accordance with the process of the invention. Illustrative examples of such olefinic compounds include: olefinically unsaturated hydrocarbons such as 1-decene, 1-hexene, 1,3-pentadiene, isobutylene, cyclohexene, 1-eicosene and styrene; and olefinically unsaturated compounds containing functional groups in addition to an olefinic double bond, such as diallyl ether, triallyl glyceryl ether, divinyl ether, 3-pentenyl butyl ether, β-allyl glycerol ether, vinyl octyl ether, vinyloxybenzene, vinyl acetate, allyl chloride, 1,3-dichloropropene, allyl alcohol, diallyl sulfide, allyl mercaptan, 1-cyclohexenol and 3-propenylphenol. The olefinically unsaturated hydrocarbons are preferred starting compounds particularly when they contain a single olefinic group and the alkenes as typified by 1-hexene and 1-decene are especially suitable. Olefinically unsaturated compounds containing from 3 to 20 carbon atoms are of the molecular size preferred for employment in the present process.

The novel concurrent reaction comprising the process of the invention is not dependent upon catalysts or elevated temperatures, and may be conducted at substantially any temperature below the decomposing temperature of the reactants. Temperatures between about 0° C. and about 200° C. constitute the preferred temperatures at which to conduct the process. It is preferable to maintain the reactants in the liquid phase, and the process of the invention is preferably conducted under a pressure greater than atmospheric pressure.

The mercaptans and the olefinically unsaturated compounds can be employed in molar ratios of from about 0.1 to 10 moles of mercaptan per mole of the olefinically unsaturated compound. The mercaptans and/or olefinically unsaturated compounds can be employed as individual compounds or as mixtures of one or more compounds. As the organic reactants in the novel concurrent reaction combine mole for mole it is preferred to employ the mercaptan and the olefinically unsaturated compound in substantially equimolar proportions. Gaseous oxygen, or gaseous mixtures containing oxygen, such as air, are preferably introduced under pressure as long as the generation of heat indicates the occurrens of reaction, or until one or more of the desired products are produced in a desired concentration.

Inert solvents can be employed in conducting the process of the invention. In general, the solvents appear to affect the process merely by diluting the reactants, although in some cases a more intimate contact and a more rapid reaction is obtained by employing a solvent. Suitable solvents for employment in the process include hydrocarbons such as pentane, nonane, benzene, toluene and cyclohexanone; ethers such as diethyl and diisopropyl ether, anisole and dioxane; and esters such as methyl acetate, isobutyl butyrate and methyl benzoate.

While catalysts and/or reaction initiators are not essential in the process of the invention, in many cases an advantageous rate of reaction can be obtained by employing, as a reaction initiator, a substance forming free radicals in the liquid phase containing the reactants. Suitable free radical forming substances include peroxidic compounds, positive halogen compounds, metallo-alkyl compounds and the like compounds which are thermally decomposed into free radicals, and compounds such as aldehydes, ketones and the like, which, as typified by acetone, are decomposed into free radicals by the action of light. The peroxides are particularly suitable as reaction initiators.

An especially suitable class of organic peroxides for employment as a reaction initiator in the present process is the class of organic peroxides containing at least one carbon atom linked to three carbon atoms and to the peroxy group (—O—O—) and having a dissociation temperature within the range of from about 0° C. to 200° C. It has been found that organic peroxides of this class have an unusual stability with respect to physical shock and conditions of storage which in the case of certain organic peroxides of different structures would cause a serious danger of explosion. Examples of organic peroxides having the above defined structure include peresters such as di-tertiary-butyl diperoxalate (recommended range 0° C. to 40° C.), di-tertiary-butyl dipermalonate (recommended range 20° C. to 60° C.) and tertiary-butyl perbenzoate (recommended range 75° C. to 115° C.); di-tertiary-alkyl peroxides such as di-tertiary-butyl peroxide (recommended range 115° C. to 150° C.), and tertiary-alkylperoxyalkanes such as 2,2-bis(tertiary-butylperoxy)butane (recommended range 80° C. to 120° C.).

The following examples illustrate the application of the invention to the conversion of typical mercaptans and olefinically unsaturated compounds. As numerous variations in the starting materials and reaction conditions are within the scope of the invention, the invention is not to be construed as limited to the particular materials and conditions recited in the detailed examples.

*Example I.—Mercaptan-olefin-oxygen (peroxide initiator)*

1-hexene and isobutyl mercaptan are converted to valuable organic compounds containing both oxygen and sulfur by passing oxygen under a pressure of 20 cm. of sulfuric acid into a solution composed of 45 grams (0.5 mole) of isobutyl mercaptan, 42 grams (0.5 mole) of 1-hexene and 3.42 grams (0.0146 mole) of di-tertiary-butyl diperoxalate maintained at a temperature of 10° C. The reaction products are isolated by a fractional distillation of the reaction mixture.

By treating 1-hexene and isobutyl mercaptan for 24 hours in the above manner over 60% of the starting material was converted to compounds containing oxygen and sulfur and having as many carbon atoms as the total of those of the mercaptan and the olefin. The products isolated were: 12 grams of isobutyl hexyl sulfide ($n_D^{20}$ 1.4569–92); 20 grams of a white crystalline solid M. P. 130.6–131.6° C., which was identified as isobutyl hexyl sulfone by the following analysis:

|  | Found | Calculated for $C_4H_9$—$SO_2$—$C_6H_{13}$ |
|---|---|---|
| C, per cent w | 58.1(1), 58.1(4) | 58.2 |
| H, per cent w | 10.6(7), 10.7(7) | 10.68 |
| S, per cent w | 15.5, 15.5 | 15.5 |

Forty grams of a light yellow oily liquid which contained hydroxyl groups was indicated to be isobutyl 2-hydroxyhexyl sulfide by the following analysis:

|  | Found | Calculated for $C_4H_9SCH_2CH(OH)C_4H_9$ |
|---|---|---|
| C, per cent w | 60.34, 60.32 | 63.2 |
| H, per cent w | 11.19 | 11.6 |
| S, per cent w | 16.3, 16.2 | 16.8 |
| Acidity, equiv/100 g | 0.008(4) |  |
| Hydroxyl value, equiv/100 g | 0.434 | 0.526 |
| Carbonyl value, equiv/100 g | 0.00(9) |  |
| Water, equiv/100 g | 0.1(9) |  |
| Mol. wt. (cryo-Dioxane) | 175(slope=+28) | 190 |
| Equiv. wt.[1] | 229 | 190 |

[1] From hydroxyl value.

And 12 grams of unreacted olefin and mercaptan. The results indicated that with exception of the reactants swept out by oxygen substantially all of the starting materials, when treated in accordance with the process of the invention, enter into the novel concurrent reaction or can be recovered for recycling.

*Example II.—Mercaptan-olefin-oxygen (no initiator)*

1-decene and octyl mercaptan are converted to valuable organic compounds containing both oxygen and sulfur atoms by passing oxygen under atmospheric pressure into a solution composed of 58.4 grams (0.40 mole) of n-octyl mercaptan and 56.0 grams (0.40 mole) of 1-decene maintained at 60° C. The reaction products are isolated by a fractional distillation of the reaction mixture.

The fact that the novel concurrent reaction is not dependent upon the presence of free radical forming reaction initiators, and that a mercaptan in the absence of an olefinic compound does not react with oxygen under conditions at which the novel concurrent reaction occurs, is illustrated by the following table of results, obtained by passing oxygen for 7 hours into 100 cc. of n-octyl mercaptan in the presence or absence of di-tertiary-butyl peroxide (abbreviated DTBP in the table), at the indicated temperatures.

| Sulfur Compound | Peroxide | Temp, °C. | Notes | Refractive Index of Solution | |
|---|---|---|---|---|---|
| | | | | Before | After |
| n-Octyl Mercaptan | None | 118 | Air | 1.4537 | 1.4537 |
| Do | DTBP, 3.4 g | 119.5 | do | 1.4537 | 1.4538 |
| Do | None | 119.5 | Oxygen | 1.4537 | 1.4538 |
| Do | DTBP, 3.4 g | 119.5 | do | 1.4537 | 1.4537 |
| Do | None | 130–150 | do | 1.4537 | 1.4538 |
| Do | DTBP, 3.4 g | 130–144 | do | 1.4537 | 1.4550 |

The surprisingly rapid reaction which occurs when the olefinic compound is present is illustrated by the following results obtained by passing oxygen into 1-decene and n-octyl mercaptan in the manner described above, at the rate of 240 cc. per minute, with the solution surrounded by a bath maintained at 90° C.

| Minutes after addition of oxygen started | Kettle Temp., °C. | Oxygen consumption in cc./min. |
|---|---|---|
| 4 | 92 | 46 |
| 9 | 94 | 102 |
| 11 | 115 | 100 |
| 15 | 100 | 40 |

The invention claimed is:

1. A method of preparing isobutyl hexyl sulfone and isobutyl 2-hydroxyhexyl sulfide which comprises passing an oxygen containing gas into a liquid solution composed of substantially equimolar amounts of 2-methylpropanethiol and 1-hexene and containing from 1 to 10 mole per cent of di-tertiary-butyl diperoxalate, at a temperature of from 0° C. to 40° C.

2. A method of preparing $C_{18}$ compounds containing sulfur and oxygen atoms in a reaction which comprises passing an oxygen containing gas into a liquid solution of substantially equimolar portions of 1-decene and octanethiol at a temperature of from 0° C. to 200° C.

3. A process for the production of organic compounds containing oxygen and sulfur in a reaction which comprises passing an oxygen containing gas into a liquid solution containing an alkanethiol and an olefin in molar proportions of from 0.1 to 10 moles of olefin per mole of mercaptan at a temperature of from 0° C. to 200° C.

4. A process for the production of organic compounds containing oxygen and sulfur in a reaction which comprises passing an oxygen containing gas into a liquid solution containing a hydrocarbon mercaptan which is free of aliphatic multiple bonds and an olefinically unsaturated hydrocarbon in molar proportions of from 0.1 to 10 moles of olefinic compound per mole of mercaptan at a temperature of from 0° C. to 200° C.

5. A process for the production of organic compounds containing oxygen and sulfur in a reaction which comprises passing an oxygen containing gas into a liquid solution containing a mercaptan and an olefinically unsaturated compound in molar proportions of from 0.1 to 10 moles of olefinic compound per mole of mercaptan at a temperature of from 0° C. to 200° C.

6. A process for the production of organic compounds containing oxygen and sulfur in a reaction comprising passing an oxygen containing gas into a liquid solution containing (A) a compound of the formula R—S—H wherein R represents a member of the group consisting of the hydrogen atom and a hydrocarbon radical, and (B) an olefinically unsaturated organic compound in a mole ratio of from 0.1 to 10 moles of (A) per mole of (B) at a temperature of from 0° C. to 200° C.

DENHAM HARMAN.

REFERENCES CITED

The following references are of record in the file of this patent:

UNITED STATES PATENTS

| Number | Name | Date |
|---|---|---|
| 2,392,295 | Rust et al. | Jan. 1, 1946 |

FOREIGN PATENTS

| Number | Country | Date |
|---|---|---|
| 681,338 | Germany | Sept. 19, 1939 |